United States Patent [19]
Mc Naughton et al.

[11] Patent Number: 5,538,297
[45] Date of Patent: Jul. 23, 1996

[54] QUICK CONNECT TUBING CONNECTOR

[75] Inventors: James Mc Naughton, Rochester; Walfred J. Liimatta, Rochester Hills; Mark G. Ketcham, Marine City, all of Mich.

[73] Assignee: Bundy Corporation, Warren, Mich.

[21] Appl. No.: 183,182

[22] Filed: Jan. 18, 1994

Related U.S. Application Data

[63] Continuation-in-part of Ser. No. 757,393, Sep. 10, 1991, Pat. No. 5,350,203.

[51] Int. Cl.⁶ ..................................... F16L 21/08
[52] U.S. Cl. ................ 285/319; 285/379; 285/305
[58] Field of Search ..................... 285/379, 305, 285/319

[56] References Cited

U.S. PATENT DOCUMENTS

| | | | |
|---|---|---|---|
| 4,294,473 | 10/1981 | Ekman | 285/321 |
| 4,637,640 | 1/1987 | Fournier et al. | 285/319 |
| 4,690,436 | 9/1987 | Henl | 285/321 |
| 4,725,081 | 2/1988 | Baur . | |
| 4,750,765 | 6/1988 | Cassidy et al. | 285/321 |
| 4,778,203 | 10/1988 | Bartholomew | 281/319 |
| 4,846,506 | 7/1989 | Bocson et al. | 285/319 |
| 4,905,964 | 3/1990 | Shiozaki | 285/319 |
| 4,979,765 | 12/1990 | Bartholomew | 285/319 |
| 4,991,627 | 2/1991 | Nix | 285/319 |
| 5,069,489 | 12/1991 | Bartholomew | 285/319 |
| 5,171,028 | 12/1992 | Bartholemew | 285/319 |
| 5,195,787 | 3/1993 | Bartholomew | 285/319 |
| 5,303,963 | 4/1994 | McNaughton et al. | 285/319 |
| 5,429,395 | 7/1995 | Ketcham | 285/319 |

FOREIGN PATENT DOCUMENTS

| | | | |
|---|---|---|---|
| 2811985 | 11/1978 | Germany | 281/319 |
| 2222861 | 3/1990 | United Kingdom | 285/319 |

*Primary Examiner*—Eric K. Nicholson
*Attorney, Agent, or Firm*—Dorn, McEachran, Jambor & Keating

[57] ABSTRACT

A quick connector for forming a joint in a fluid line consists of a female connector body having a bore which receives a male member. A sleeve surrounds and is secured on the male member in close fitting relation with the male member and with the female connector body. A retainer extends between the sleeve and a radial face formed in the connector body to secure the male member in the connector body. A secondary retainer provides enhanced retention capability. An optional plug may be positioned in the bore entrance to prevent introduction of external contaminants.

15 Claims, 14 Drawing Sheets

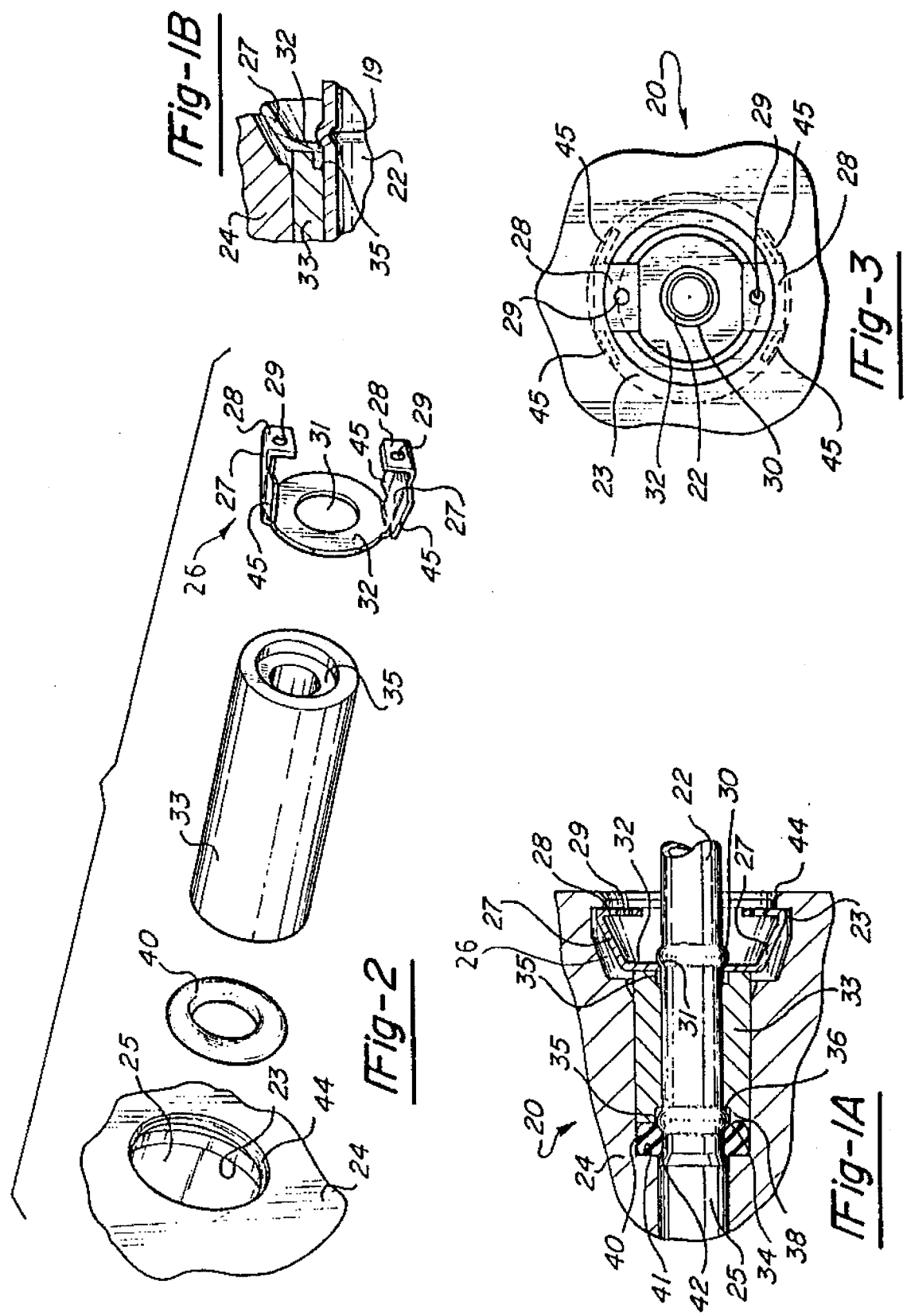

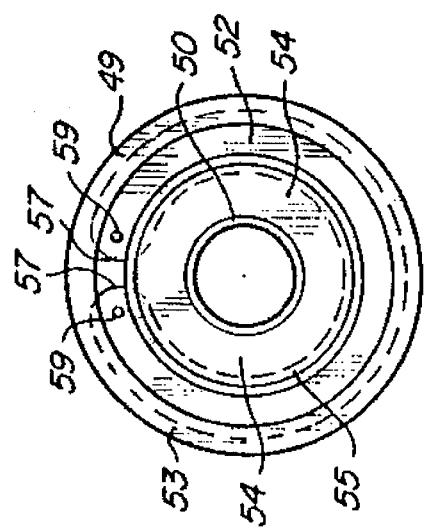
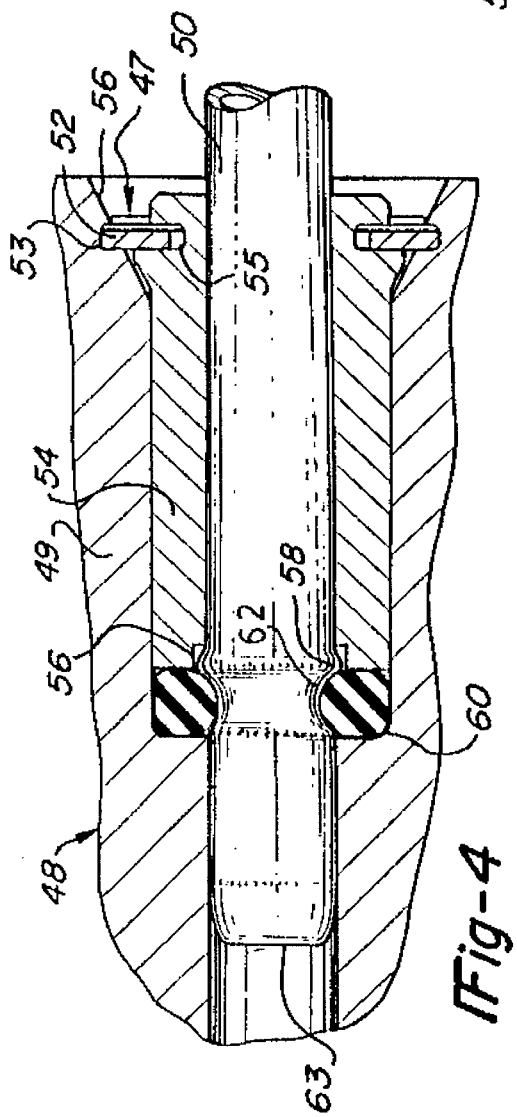
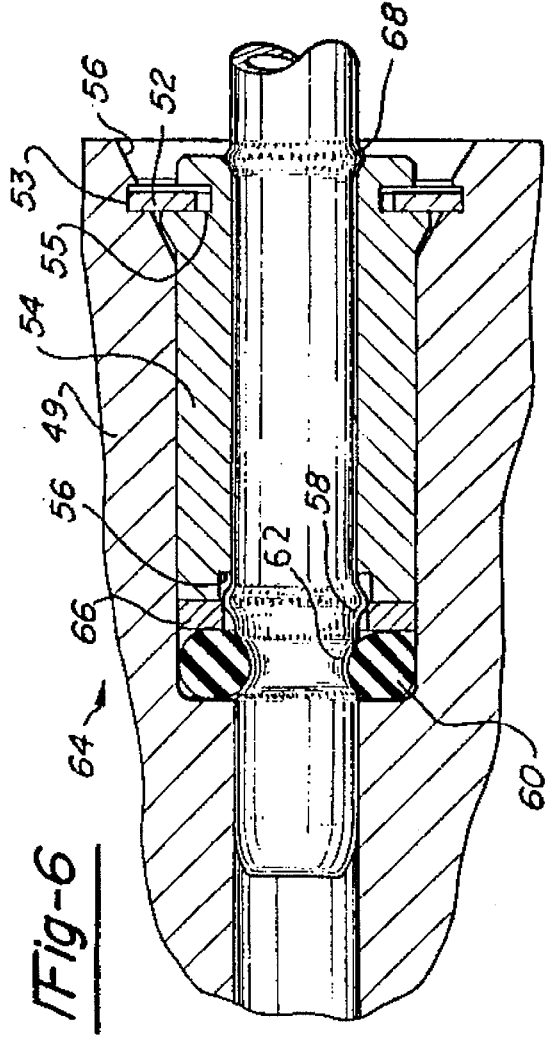

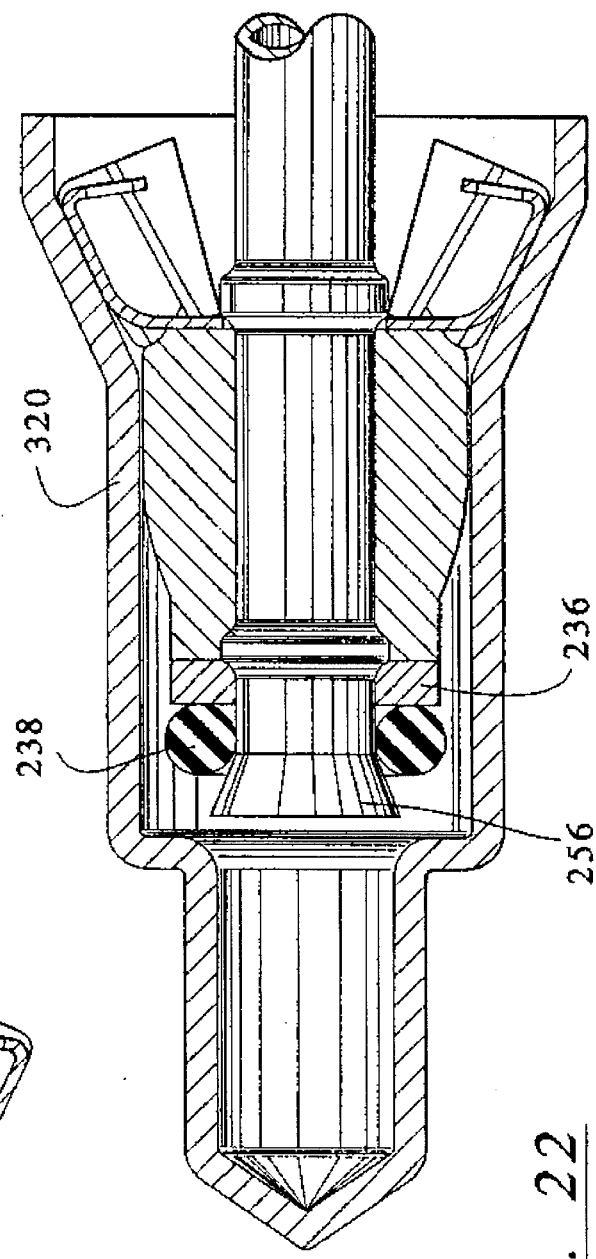
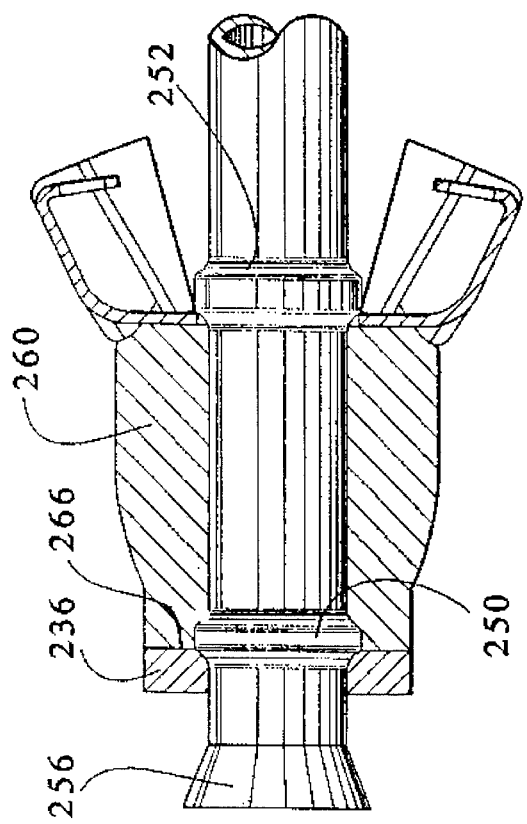
FIG. 21
FIG. 22

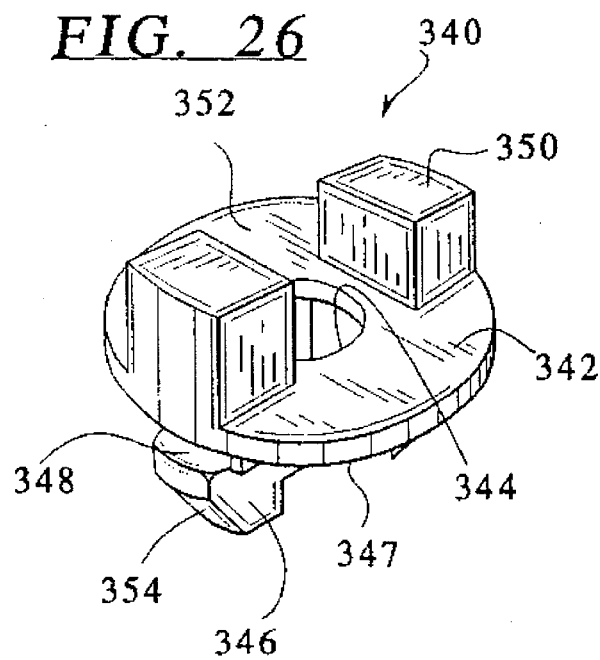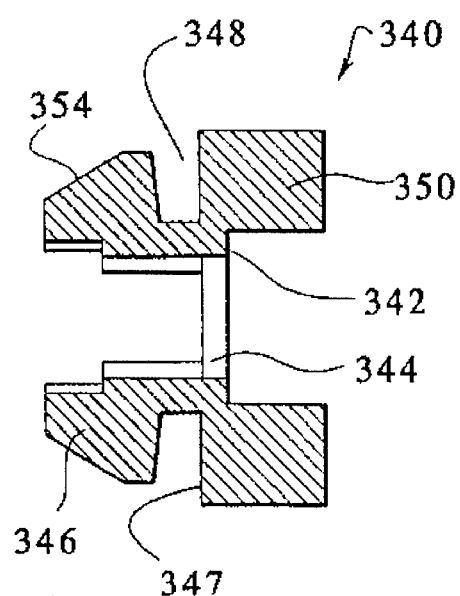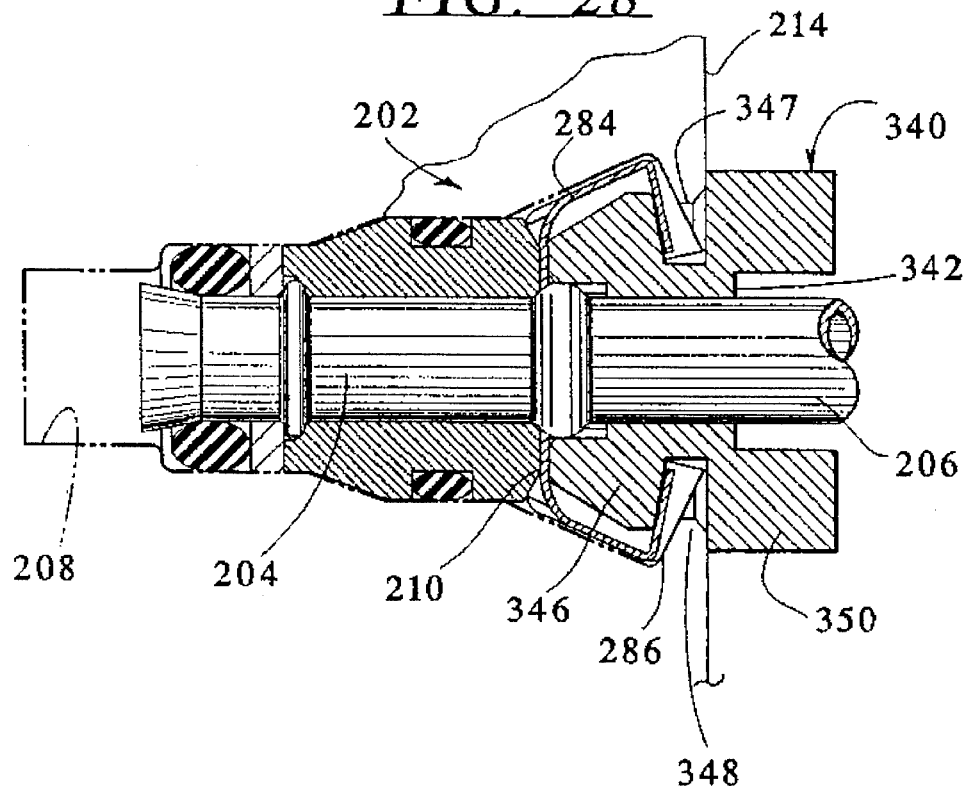

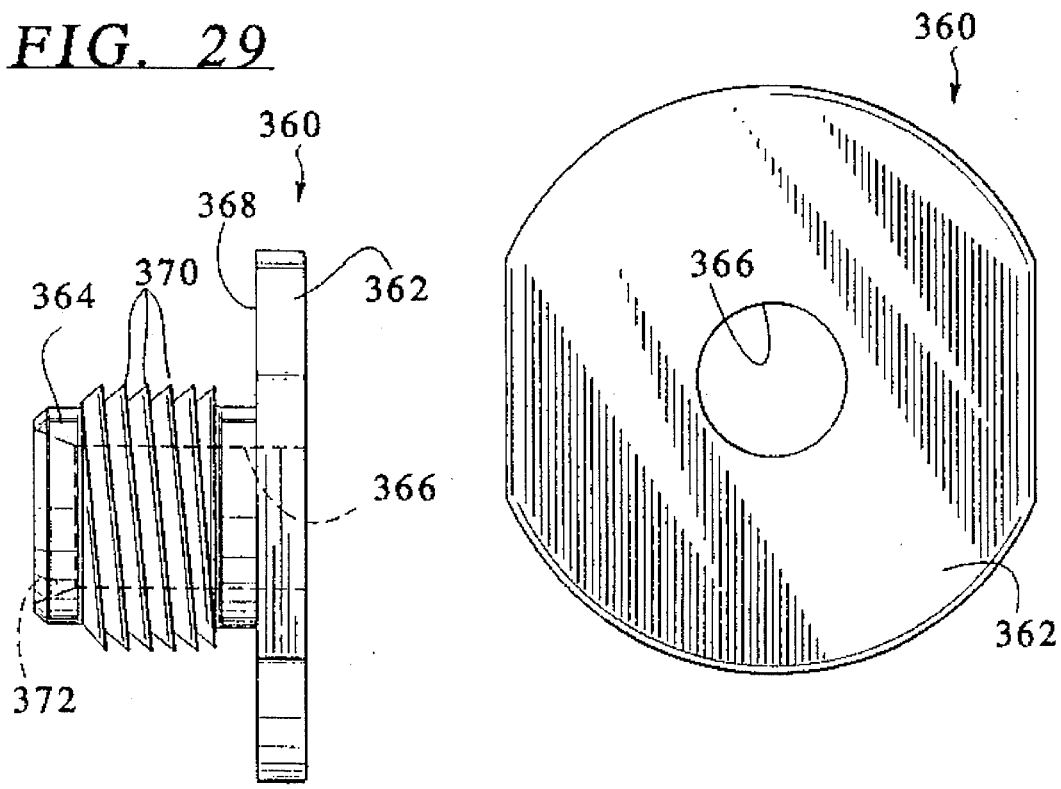
FIG. 29
FIG. 30
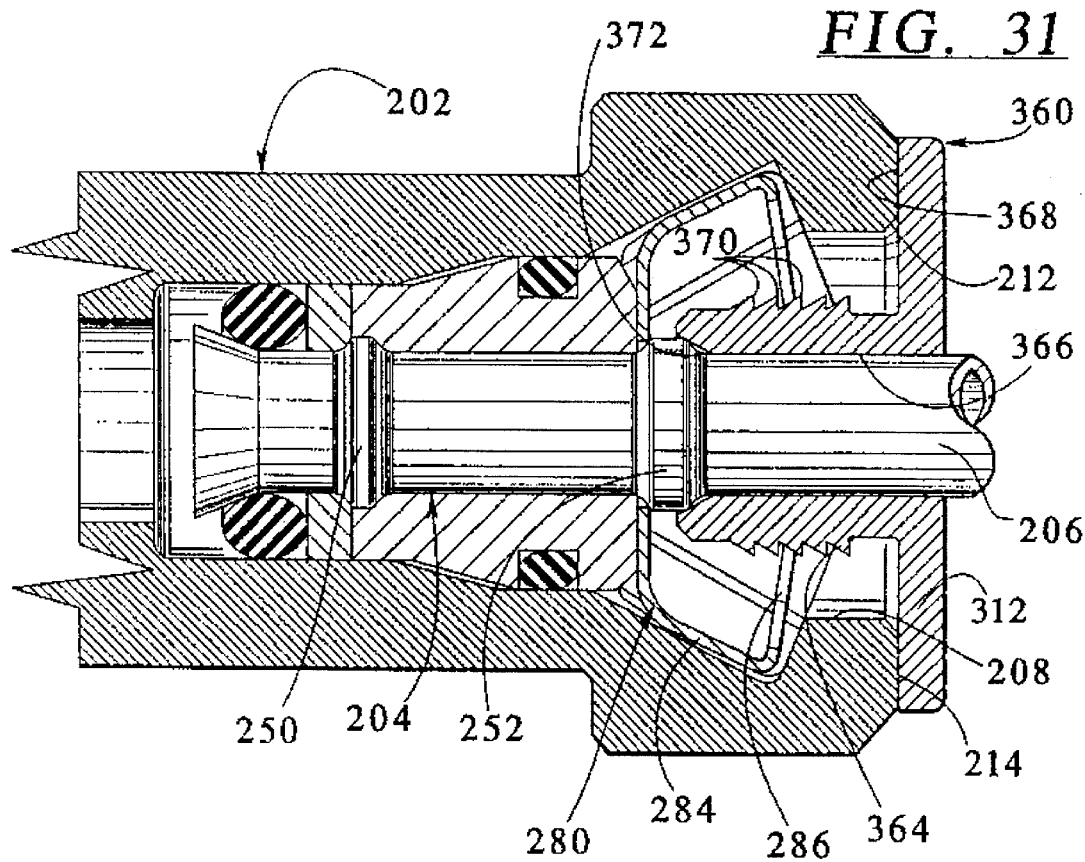
FIG. 31

QUICK CONNECT TUBING CONNECTOR

This application is a continuation-in-part of Ser. No. 757,393, now U.S. Pat. No. 5,350,203, filed on Sep. 10, 1991 and issued on Sep. 27, 1994.

BACKGROUND OF THE INVENTION

This invention relates to fluid line systems which include quick connector couplings that provide a strong, fluid-tight seal, and more particularly to quick connector couplings that may be utilized in a high pressure system.

In automotive and other fields, quick connector couplings are often utilized to provide a fluid connection between two components or conduits, thus establishing a fluid line between the two components, ususally a rigid tube and a system element contained within a metal housing. Use of quick connector couplings is advantageous in that a sufficiently secured and sealed fluid line may be established with a minimum amount of time and expense.

In high pressure fluid lines of the sort typically found in hydraulic brake, power steering, air conditioning or other systems, it is essential that quick connector couplings (1) provide a strong and secure connection that will withstand extreme ranges of operational pressures; (2) are quickly and easily connectable; and (3) maintain a fluid-tight seal.

Prior art quick connectors have not been reliable and have failed to achieve at least one of the above goals. Connectors providing relatively quick connections have often been complex and have not always provided fluid-tight seals. Other connectors have failed to maintain system integrity while subject to high operational pressures. Connectors providing relatively strong connections have been cumbersome and difficult to assemble.

The quick connector of the present invention addresses these prior deficiencies.

SUMMARY OF THE INVENTION

The present invention provides a quick connector for forming a joint in a fluid line system. The connector includes a female connector body having a bore extending axially inwardly from an entrance. A radial face is defined in the bore adjacent the entrance. A male member formed at an end of a tube is received in the connector body bore.

A cylindrical sleeve coaxially surrounds the male member and fits closely within the bore. The sleeve mates with a radially outer surface of the male member and a radially inner surface of the female connector body over a majority of its length to minimize radial displacement of the tube relative to the connector body.

A primary retainer surrounds the male member axially outwardly of the sleeve. An axially inner end of the retainer contacts an axially outer end of the sleeve to secure the sleeve in the bore. Arms extend away from the axially inner end of the retainer and contact the radial face formed in the connector body to secure the retainer in the bore.

The quick connector may also include a secondary retainer that surrounds the male member axially outwardly of the primary retainer. The secondary retainer includes an axially extending ring surrounding the male member and arms extending from the ring and contacting the radial face of the connector body to retain the secondary retainer in the bore.

The quick connector may further include a plug positioned in the entrance to the bore to exclude external contaminants. The plug includes a ring surrounding the male member and extending radially between an axially outer surface of the connector body and and the male member. Prongs extend from an axially inner surface of the ring into the bore and are positioned in circumferential alignment with the primary retainer arms to secure the plug in the bore entrance.

BRIEF DESCRIPTION OF THE DRAWINGS

FIG. 1A is a partial sectional view of a first embodiment of a quick connector according to the present invention;

FIG. 1B is an exploded sectional view of a quick connector similar to the quick connector of FIG. 1A, but slightly modified;

FIG. 2 is a perspective view of parts of an unassembled quick connector;

FIG. 3 is a front view of the quick connector of FIG. 1A;

FIG. 4 is a partial sectional view of a second embodiment of a quick connector according to the present invention;

FIG. 5 is a front view of the quick connector of FIG. 4;

FIG. 6 is a partial sectional view of a third embodiment of a quick connector according to the present invention;

FIGS. 18–25 are a series of partial sectional views illustrating the assembly steps for the quick connector depicted in FIG. 8;

FIG. 26 is a perspective view of a plug according to the present invention;

FIG. 27 is a sectional view of the plug of FIG. 26;

FIG. 28 is a partial sectional view of the plug of FIG. 26 installed in a quick connector;

FIG. 29 is a side elevation view of a second embodiment of a plug according to the present invention;

FIG. 30 is a front elevation view of the plug of FIG. 29; and

FIG. 31 is a partial sectional view of the plug of FIG. 29 installed in a quick connector.

DETAILED DESCRIPTION OF THE PREFERRED EMBODIMENTS

Figure 7:
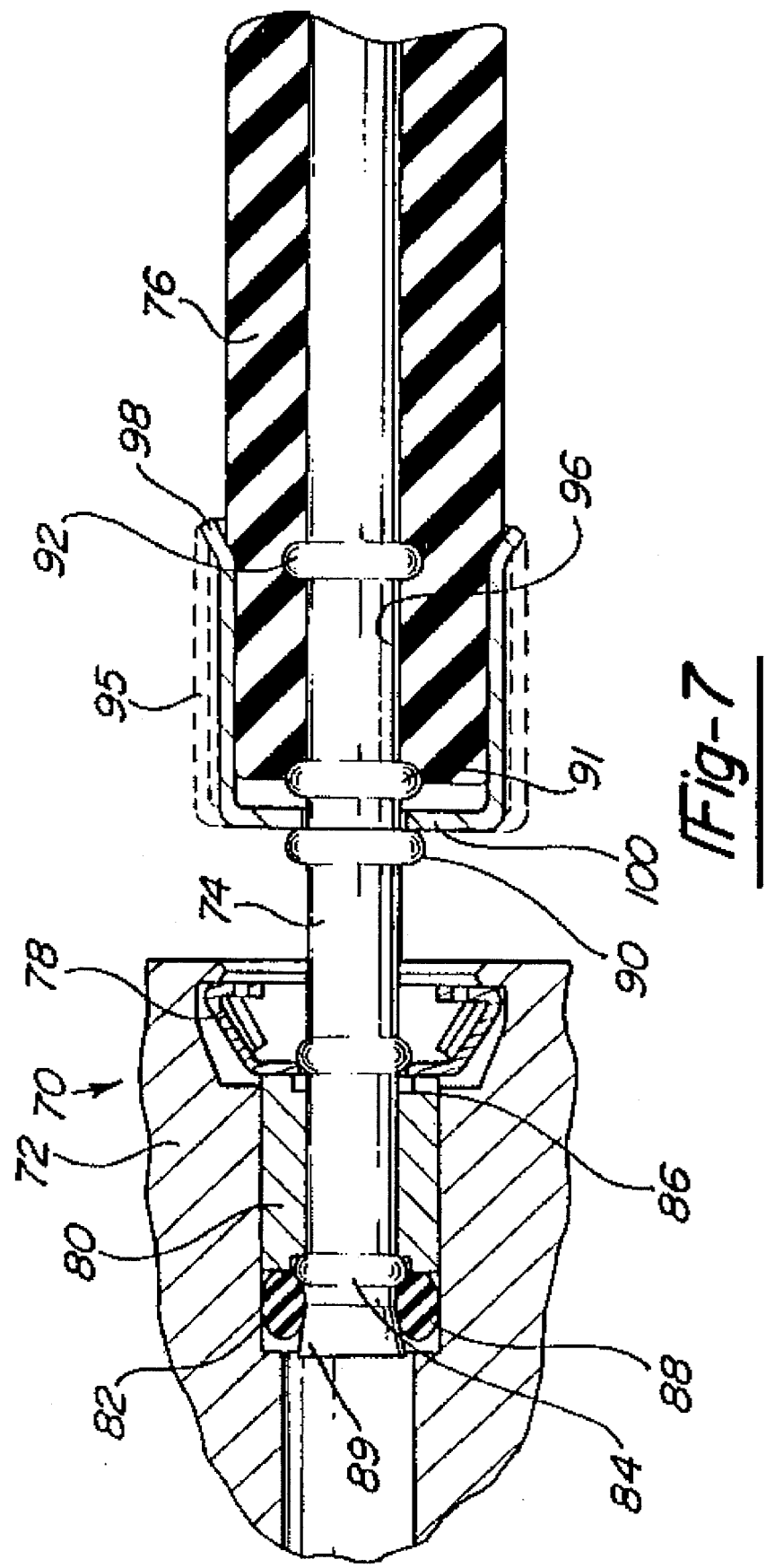
FIG. 7 is a partial sectional view showing a further feature of the present invention.

FIG. 1A shows a quick connector 20 comprised of a female connector body 24 and a male member 22 formed at an end of a tube which forms a part of a fluid line system. The tube is typically connected to flexible tubing (see, for example, FIG. 7) which leads to a source of high pressure fluid, such as a hydraulic brake, air conditioning or power steering line. Female connector body 24 and male member 22 are connectable to form a permanent, but severable, joint.

Connector body 24 is hollow, defining a bore 25 which extends axially inwardly from a chamfered entrance portion 44. An axially inwardly facing face 23 of relatively large radial dimension is defined in bore 25 adjacent entrance portion 44. An axially outwardly facing face 41 of relatively smaller radial dimension is defined in bore 25 adjacent a fluid discharge portion of bore 25.

Male member 22 includes a first enlarged upset 30 and a second enlarged upset 34 spaced apart by a lesser diameter portion of male member 22. End 42 of male member 22 is received in a fluid discharge portion of bore 25. It is flared outwardly and is spaced axially inwardly from second upset 34.

A seal in the form of an "O" ring 40 surrounds and is secured on male member 22 between second upset 34 and flared end 42. "O" ring 40, as well as other "O" rings which will be described herein, is preferably of the type commonly known as E.P.D.M. It is in sealing engagement with, and compressed radially between, an outer surface of male member 22 and an inner surface of female connector body 24, sealing off the fluid discharge portion of bore 25 from the remainder of connector body 24. Additionally, "O" ring 40 is compressed axially between, and in sealing engagment with, radial face 41 of connector body 24 and a sleeve 33 (to be described in more detail herein) to provide further sealing protection.

A hollow, cylindrical sleeve 33 surrounds and is retained on male member 22 between first upset 30 and second upset 34. Sleeve 33 is coaxial to male member 22 and has an inner diameter approximately equal to the outer diameter of male member 22. Thus, there is snug, mating contact between sleeve 33 and male member 22 between upsets 30 and 34. This close fit prevents relative radial movement between sleeve 33 and male member 22. Sleeve 33 is preferably formed from 12L14 steel.

Radial notches 35 are formed at each axial end of sleeve 33. At the inner axial end, notch 35 defines a radially inner face 36 and a radially outer face 38. Inner face 36 abuts the axially outer extent of second upset 34. Outer face 38 extends over the crest of upset 34, abutting "O" ring 40 and thus assisting in the seating of "O" ring 40.

The outer peripheral surface of sleeve 33 is coaxial to, and in wall-to-wall, or mating contact with the inner peripheral surface of connector body 24. This close fitting relation prevents relative radial movement between sleeve 33 and connector body 24. In combination with the close fit of sleeve 33 about male member 22, system stability is enhanced by minimizing radial displacement of male member 22 relative to connector body 24. This is particularly important in systems subject to extreme pressure ranges and abrupt pressure changes.

A retainer or locking member 26, preferably made of stainless steel, is disposed in connector body 24. It includes a central, radial ring 32 having a bore 31. Ring 32 surrounds and is retained on male member 22 between first upset 30 and an axially outer face of sleeve 33. Two 180 degree displaced arms 27 extend away from ring 32 to radially inwardly bent tangs 28. Tangs 28 contact face 23 of connector body 24 to prevent removal of retainer 26, sleeve 33 and male member 22 from bore 25. Holes 29 are formed in tangs 28 (FIGS. 2 and 3) to permit use of a tool for insertion or removal of retainer 26.

Each arm 27 supports along its side edges a pair of braces 45. Braces 45 extend circumferentially and slightly radially inwardly from each arm 27. Braces 45 add strength to arms 27 and help to resist buckling should a removal force be applied to male member 22.

A slightly modified version of retainer 26 is shown in FIG. 1B. A cylindrical lip 19 extends from ring 32 of retainer 26 and is received in notch 35 of sleeve 33, assisting in retention of retainer 26 on male member 22.

A second embodiment of the present invention is illustrated in FIG. 4. Quick connector 48 comprises a male member 50 secured within a bore 47 formed in a female connector body 49. Bore 47 extends axially inwardly from an enlarged, conical entrance portion 56 to a fluid discharge portion at an end remote from entrance portion 56. An annular notch 53 is formed in connector body 49 adjacent entrance portion 56.

Male member 50 is formed at an end of a tube which forms a part of a fluid line system. End 63 of male member 50 is received in the fluid discharge portion of bore 47. Male member 50 includes an enlarged diameter upset 58 and a reduced diameter ditch 62 formed between upset 58 and end 63. A seal in the form of an "O" ring 60 is seated in ditch 62 in sealing engagement with connector body 49 and male member 50, sealing off the fluid discharge portion of bore 47 from the remainder of the bore.

A hollow, cylindrical sleeve 54 surrounds male member 50. As in the first embodiment quick connector, sleeve 54 fits snugly in wall-to-wall or mating contact with male member 50 and connector body 49, minimizing relative radial movement between the two. A radial notch 46 is formed in an inner axial end of sleeve 54. Notch 46 receives upset 58 of male member 50 and prevents retraction of member 50 from sleeve 54. An annular notch 55 is formed at an outer axial end of sleeve 54 in its outer periphery, and in axial alignment with notch 53 formed in connector body 49.

A resilient semi-circular lock ring 52 is received within annular notch 55 of sleeve 54 and annular notch 53 of connector body 49 to retain sleeve 54 and male member 50 within connector body 49. Lock ring 52 is illustrated in more detail in FIG. 5. It includes a pair of spaced ends 57 with holes 59 formed therein to facilitate insertion or removal of ring 52 through entrance 56. The tapered surface of conical entrance 56 also assists in insertion and removal of ring 52.

A third quick connector embodiment is illustrated in FIG. 6. Quick connector 64 of FIG. 6 is very similar to quick connector 48 of FIG. 4. There are two essential differences. First, male member 50 of quick connector 64 has a second upset 68 formed thereon to retain sleeve 54 on member 50. This facilitates assembly of male member 50, sleeve 54, lock ring 53 and the seal components as a one-piece unit to be directly inserted into connector body 49.

Second, a spacer 66 is disposed between sleeve 54 and "O" ring 60. Spacer 66 abuts the inner axial face of sleeve 54 and compresses "O" ring 60 against a radial face formed in connector body 49. "O" ring 60 is also compressed between male member 50 and connector body 49 to provide a fluid-tight seal.

Similar methods may be utilized to assemble the above quick connector embodiments. A tube on which a male member is to be formed is initially of uniform diameter. A first enlarged upset is formed on the tube (30, 68) spaced from one end. The upset is formed by a standard upset machine. This step is omitted in the second quick connector embodiment illustrated in FIG. 4.

Next, the retainer, or lock ring, and sleeve are moved onto the tube from the one end toward the upset. In embodiments utilizing a retainer (FIG. 1A), a retainer 26 is moved onto male member from end 42 to abut upset 30, and sleeve 33 is then moved onto male member 22 from end 42 to abut ring 32 of retainer 26. In embodiments utilizing a lock ring (FIGS. 4 and 6), lock ring 52 is snapped into groove 55 formed in sleeve 54, and the groove-lock ring combination are then moved onto male member 50 from end 63 to move freely on male member 50 (FIG. 4), or to abut upset 68 (FIG. 6).

After the retainer (lock ring) and sleeve have been installed, a second upset (34, 58) is formed to secure the sleeve and retainer on the tube. Next, either end 42 of male member 22 is flared outwardly to form a seal retaining portion (FIG. 1A), or a ditch 62 is formed in male member 50 to form a seal retaining portion (FIGS. 4 and 6). An "O" ring seal (40, 60) and in FIG. 6, a spacer 66, are then moved onto the seal retaining portion.

A seal-sleeve-retainer-male member unit assembled as above may be utilized as a one-piece unit, directly insertable into a female connector body. All parts of the unit pass easily into the connector body bore, with the exception of the retainer or lock ring. The retainer and lock ring are provided with tangs so that an installation tool may be used as an aid in installation. Thus, in FIG. 1A, an installation tool is used in conjunction with tangs 28 to flex arms 27 of retainer 26 radially inwardly. The entire unit is then passed through entrance 44 and into connector body 24 until tangs 28 pass face 23 of body 24. Retainer 26 is then relaxed, and tangs 28 seat against face 23 to retain the unit within the connector body. In FIGS. 4 and 6, an installation tool is used to flex spaced ends 57 of lock ring 52 toward each other. The unit is then passed into connector body 49 until ring 52 seats in groove 53.

FIG. 7 illustrates a hose assembly which may be utilized with any of the described quick connector embodiments. Quick connector 70 of FIG. 7 is very similar to quick connector 20 of FIG. 1A. A female connector body 72 receives a tube 74. Two upsets 84 and 86 are formed on the end of tube 74 disposed in connector body 72. End 89 of tube 74 is received in a fluid discharge portion of the connector body bore and is flared outwardly. A seal in the form of an "O" ring 82 is retained on tube 74 between flared end 89 and upset 84. Sleeve 80 is retained on tube 74 between upsets 84 and 86. Retainer 78 secures tube 74, sleeve 80 and "O" ring 82 within connector body 72.

The hose assembly is formed on the end of tube 74 opposite the end received in connector body 72. Three spaced upset portions, 90, 91 and 92, are formed on tube 74. A flexible hose 76 is moved over tube 74 so that it passes over upset 92 and terminates above the crest of upset 91.

A ferrule 94 is disposed on tube 74. Ferrule 94 consists of a ring portion 100 disposed between upsets 90 and 91 and a cylindrical portion 95 (phantom) extending therefrom over flexible hose 76. Ferrule 94 is crimped radially inwardly to secure flexible hose 76 on tube 74 between upsets 91 and 92. End 98 of ferrule 94 may flex slightly radially outwardly as a result of crimping.

The hose assembly portion of tube 74 is preferably formed after the male member portion of the tube is formed and assembled. The male member portion is formed in a fashion similar to the quick connector embodiments discussed above. Alternatively, the hose assembly portions may be formed first and the male member portions last.

In forming the hose assembly portions, upset 90 is first formed on tube 74. Ferrule 94 is then moved across tube 74 so that ring portion 100 abuts upset 90. Upset 91 is formed to secure ferrule 94 on tube 74. Next, upset 92 is formed. Hose 76 is then forced onto tube 74 across upsets 91 and 92. Finally, ferrule 94 is crimped radially inwardly to secure hose 76 on tube 74.

Figure 8:
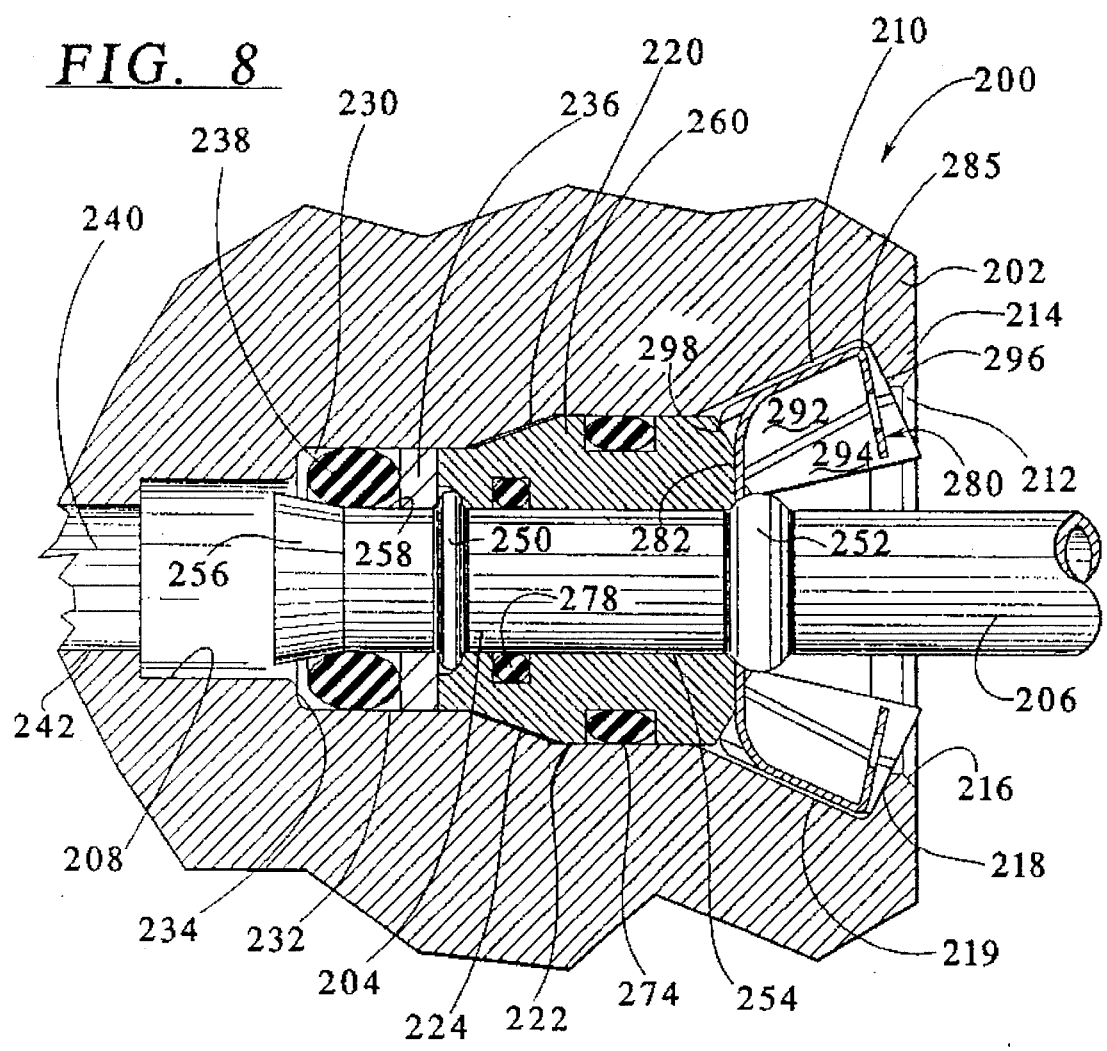
FIG. 8 is a partial sectional view of a fourth embodiment of a quick connector according to the present invention.

A fourth embodiment of the invention, especially applicable to automotive hydraulic brake systems, is illustrated in FIGS. 8–28. Quick connector 200 shown in FIG. 8 is comprised of a female connector body 202 and a male member 204 formed at an end of a tube 206 which forms a part of a fluid line system. Female connector body 202 and male member 204 are connectable to form a permanent, but severable, joint.

Connector body 202 is hollow, defining an axial bore 208. It includes an enlarged retainer housing portion 210 at an end having an entrance 212 defined by a radial annular rim 214. Rim 214 is chamfered at 216 to facilitate insertion of male member 204 into bore 208. Connector body 202 further defines a sleeve housing portion 220, a seal housing portion 230, and a fluid discharge portion 240 at an end remote from retainer housing portion 210.

Retainer housing portion 210 is defined by a radial, annular face 218 extending at an angle away from rim 214, and a first frustro-conical surface 219 extending from face 218. Sleeve housing portion 220 extends away from and is of reduced diameter relative to retainer housing portion 210. It is comprised of a first cylindrical sealing surface 222 and a second frustro-conical surface 224. Seal housing portion 230 extends away from and is of reduced diameter relative to sleeve housing portion 220. It is comprised of a second cylindrical sealing surface 232 and a radial shoulder 234. Fluid discharge portion 240 includes a conduit 242 leading to a fluid system component (not shown).

Male member 204 is formed at an end of a tube 206. Generally, an end of tube 206 remote from male member 204 will be connected to flexible tubing which leads to a fluid line component (not shown). For example, the remote end of tube 206 could be configured to connect to the hose assembly shown in FIG. 7.

Male member 204 includes a first enlarged upset 250 and a second enlarged upset 252, spaced apart by a first cylindrical surface 254. End 256 of male member 204 is received in fluid discharge portion 240 of female connector body 202. It is flared outwardly and is spaced from first upset 250 by a second cylindrical surface 258.

A spacer 236 and a seal in the form of an "O" ring 238 are disposed in seal housing portion 230 of female connector body 202. Spacer 236 and "O" ring 238 surround and are secured on male member 204 between first upset 250 and flared end 256. "O" ring 238 is in sealing engagement with second cylindrical surface 258 of male member 204 and second sealing surface 232 of female connector body 202, sealing off fluid discharge portion 240 from the remainder of female connector body 202. Additionally, "O" ring 238 may be compressed between spacer 236 and flared end 256.

A cylindrical sleeve 260 is disposed in sleeve housing portion 220 of female connector body 202. Sleeve 260 is hollow, defining a bore 262. It surrounds and is retained on male member 204 between first and second upsets 250 and 252.

Figure 9:
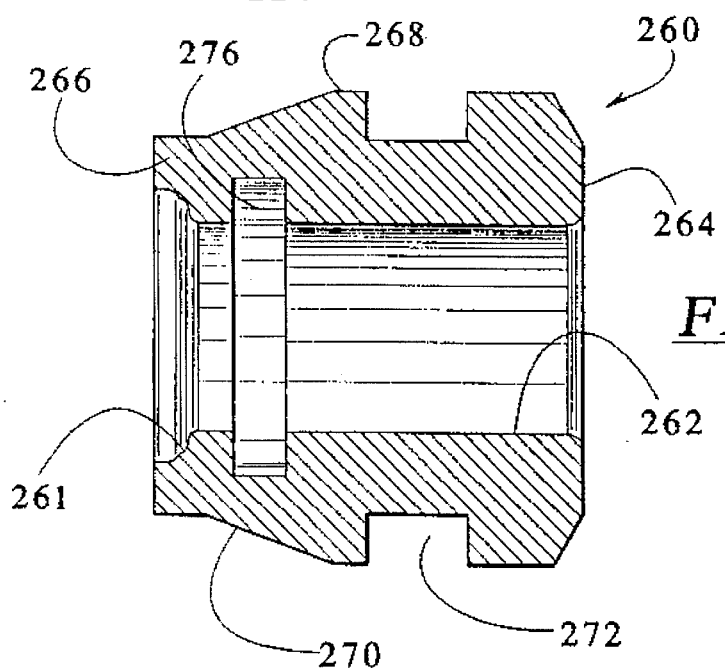
FIG. 9 is a sectional view of the sleeve illustrated in FIG. 8.

Sleeve 260 is illustrated in more detail in FIG. 9. It extends between a forward face 264 and a rearward face 266. The majority of sleeve bore 262 is coaxial to, and has a diameter approximately equal to that of, first cylindrical surface 254 of male member 204, so that there is a mating relation between sleeve 260 and male member 204 between upsets 250 and 252. The snug fit between sleeve 260 and male member 204 is effective to eliminate or minimize relative radial movement between the two.

An enlarged diameter portion of bore 262 defines a radially sloped shoulder 261 which engages first upset 250 of male member 204, preventing withdrawl of member 204 from body 202. Rearward face 266 extends past the crest of first upset 250, abutting spacer 236 and thus assisting in the seating of "O" ring 238.

The outer peripheral surface of sleeve 260 mates with the the adjacent inner peripheral surface of sleeve housing portion 220 of connector body 202. A cylindrical surface portion 268 of the outer peripheral surface of sleeve 260 mates with first sealing surface 222 of sleeve housing portion 220, and a frusto-conical surface portion 270 of the outer peripheral surface of sleeve 260 mates with second frustro-conical surface 224. Surface 224 serves as a stop to limit inward axial insertion of sleeve 260 into bore 208.

The close fit of sleeve 260 both around male member 204 and within connector body 202 enhances system stability by preventing radial displacement of tube 206 relative to body 202. This is particularly important in volatile systems such as automotive hydraulic brake systems, which are often subject to wide and extreme ranges of fluid pressures. Excessive vibration, or bouncing, of tube 206 within body 202 would lead to accelerated deterioration of the connection and a possible breakdown. The relation between sleeve 260, male member 204 and connector body 202 stabilizes the connection and prevents such a result.

Grooves 272 and 276 are formed, respectively, in the outer and inner peripheral surfaces of sleeve 260. They receive "O" ring seals 274 and 278. These additional "O" rings provide further sealing protection in addition to that already provided by "O" ring 238. "O" ring 274 is in sealing engagement with first sealing surface 222 of sleeve housing portion 220 and the outer peripheral surface of sleeve 260, while "O" ring 278 is in sealing engagement with first cylindrical surface 254 of male member 204 and the inner peripheral surface of sleeve 260. While the additional sealing protection provided by seals 274 and 278 is desirable, seal 238 could be effectively utilized alone to seal fluid discharge portion 240.

Two retainers, a primary retainer 280 (FIG. 8) and a secondary retainer 300 (FIG. 10), are disposed within retainer housing portion 210 of female connector body 202.

Figure 12:
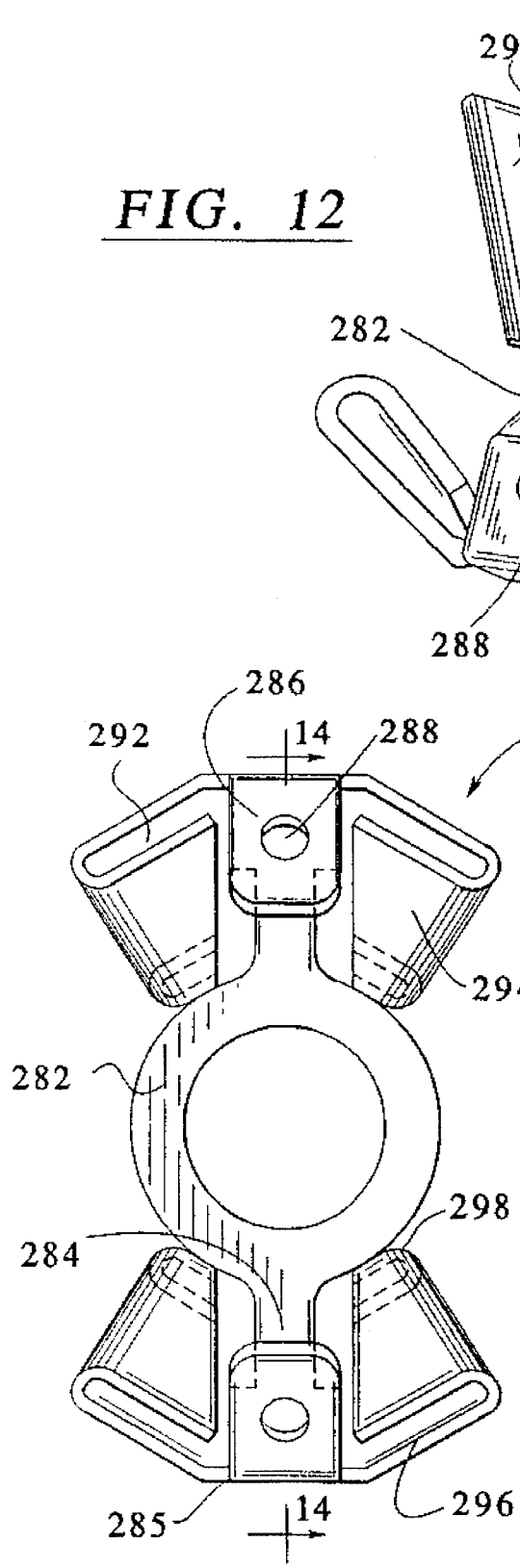
FIG. 12 is a perspective view of the primary retainer illustrated in FIG. 8.
Figure 14:
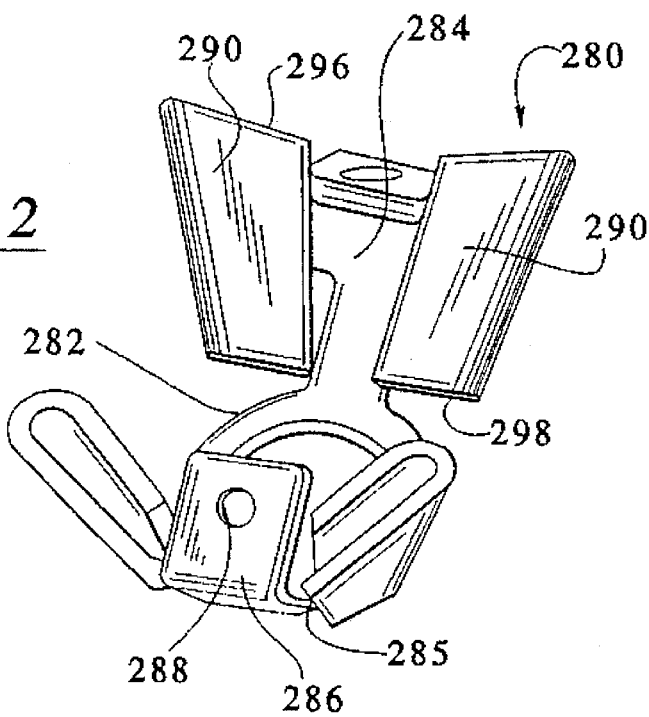
FIG. 14 is a sectional view on line 14–14 of FIG. 13.
Figure 13:
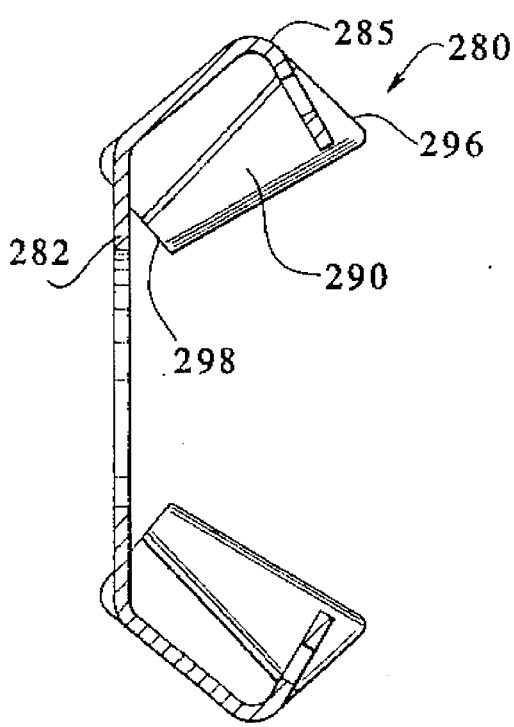
FIG. 13 is a front elevation of the primary retainer.
Figure 15:
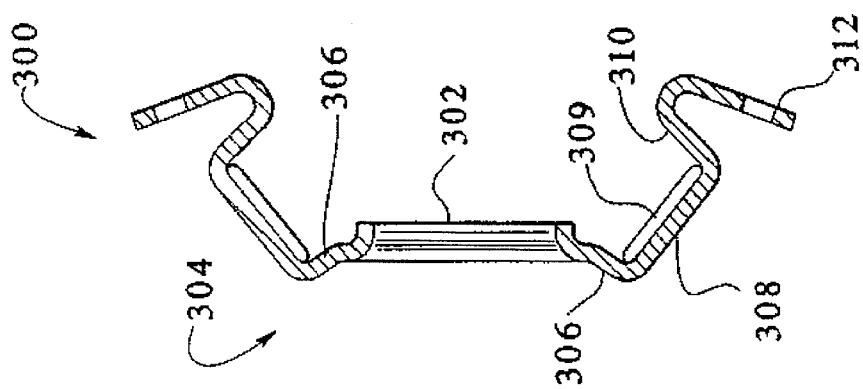
FIG. 15 is a side elevation of the secondary retainer depicted in FIG. 10.
Figure 16:
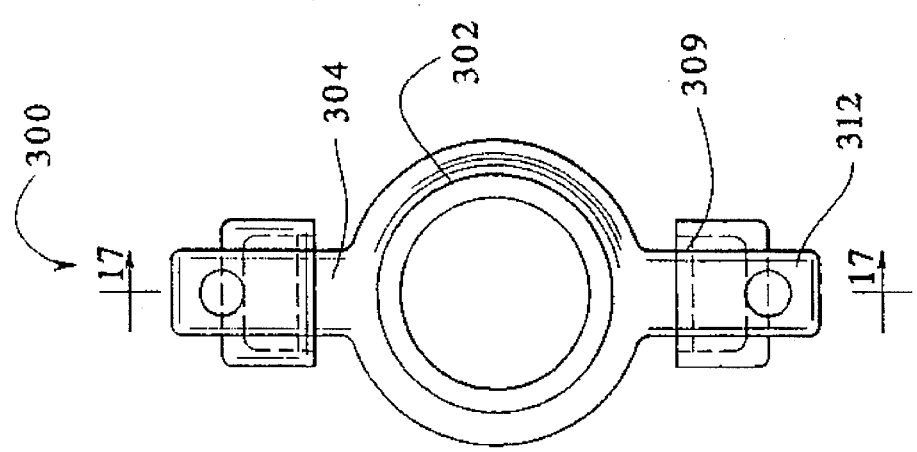
FIG. 16 is a front elevation of the secondary retainer.
Figure 17:
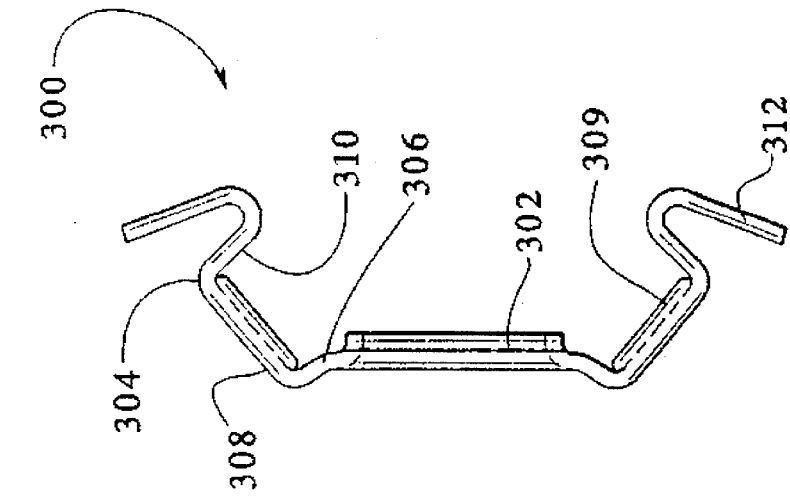
FIG. 17 is a sectional view along the line 17—17 of FIG. 16.

Primary retainer 280, illustrated in detail in FIGS. 12–14, includes a central, radial ring 282. Ring 282 surrounds and is retained on male member 204 between second upset 252 and forward face 264 of sleeve 260. Two 180 degree displaced arms 284 extend away from ring 282 to bends 285. Bends 285 contact radial face 218 of retainer housing portion 210 to retain the seal-sleeve-male member assembly within connector body 202. Extending away from bends 285 are tangs 286. Tangs 286 define openings 288 and are intended to assist in the installation of retainer 280.

Each arm 284 supports along its side edges a pair of wings 290. Each wing 290 is comprised of a first portion 292 extending away from a side edge of an arm 284, and a second portion 294 which is bent over the first portion 292 and extends back towards the arm 284. Wings 290 extend between first edges 296 adjacent tangs 286, and second edges 298 adjacent ring 282.

Wings 290 serve two important functions. First, they strengthen retainer 280, helping to prevent buckling of the retainer during exposure to operational pressures. Second, like arm bends 285, wing edges 296 contact radial face 218 to assist in the retention of the seal-sleeve-male member assembly within bore 208. The opposite wing edges 298 may abut forward face 264 of sleeve 260 to provide further retention force.

Figure 10:
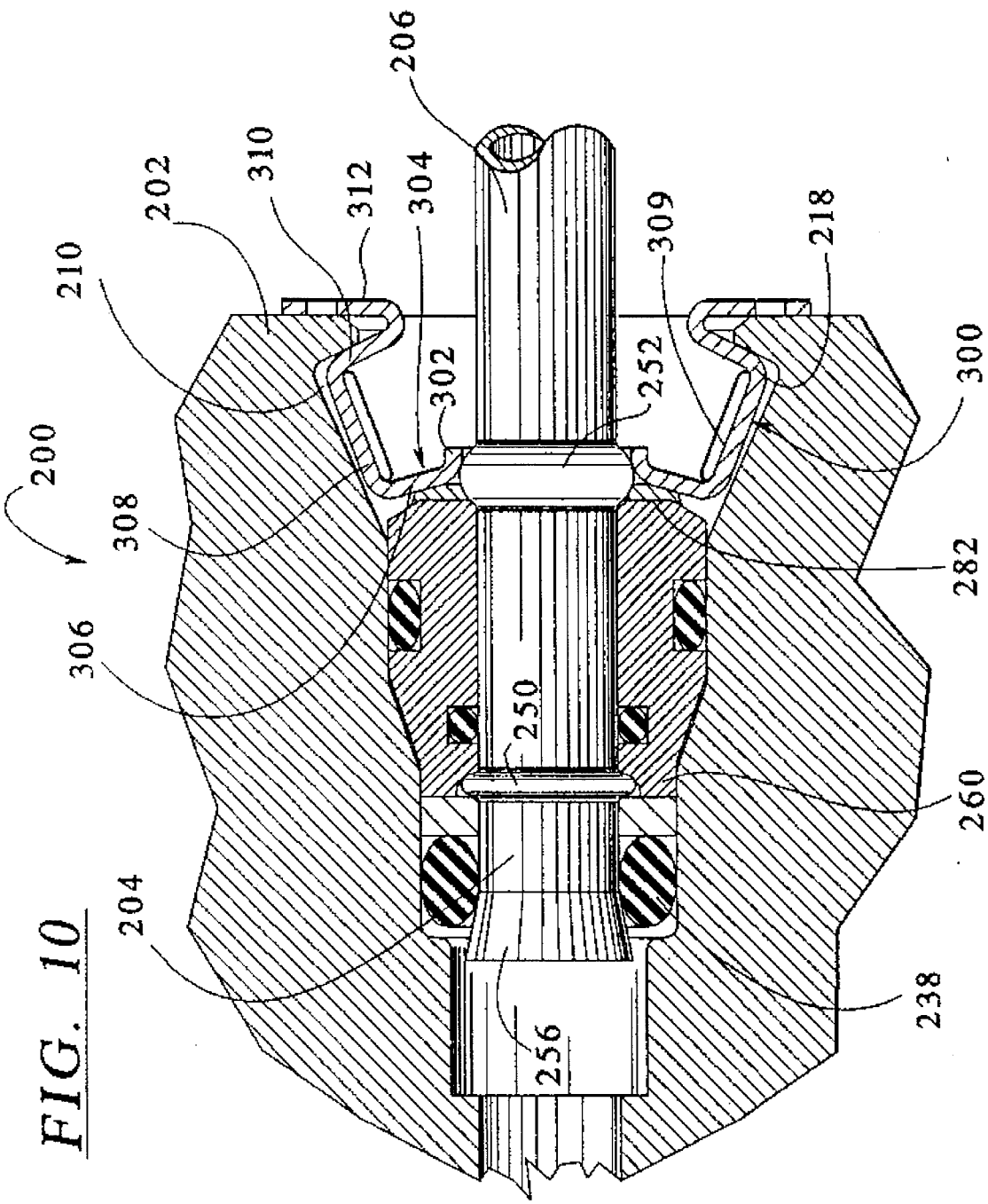
FIG. 10 is a partial sectional view of the quick connector of FIG. 8, rotated 90 degrees.
Figure 11:
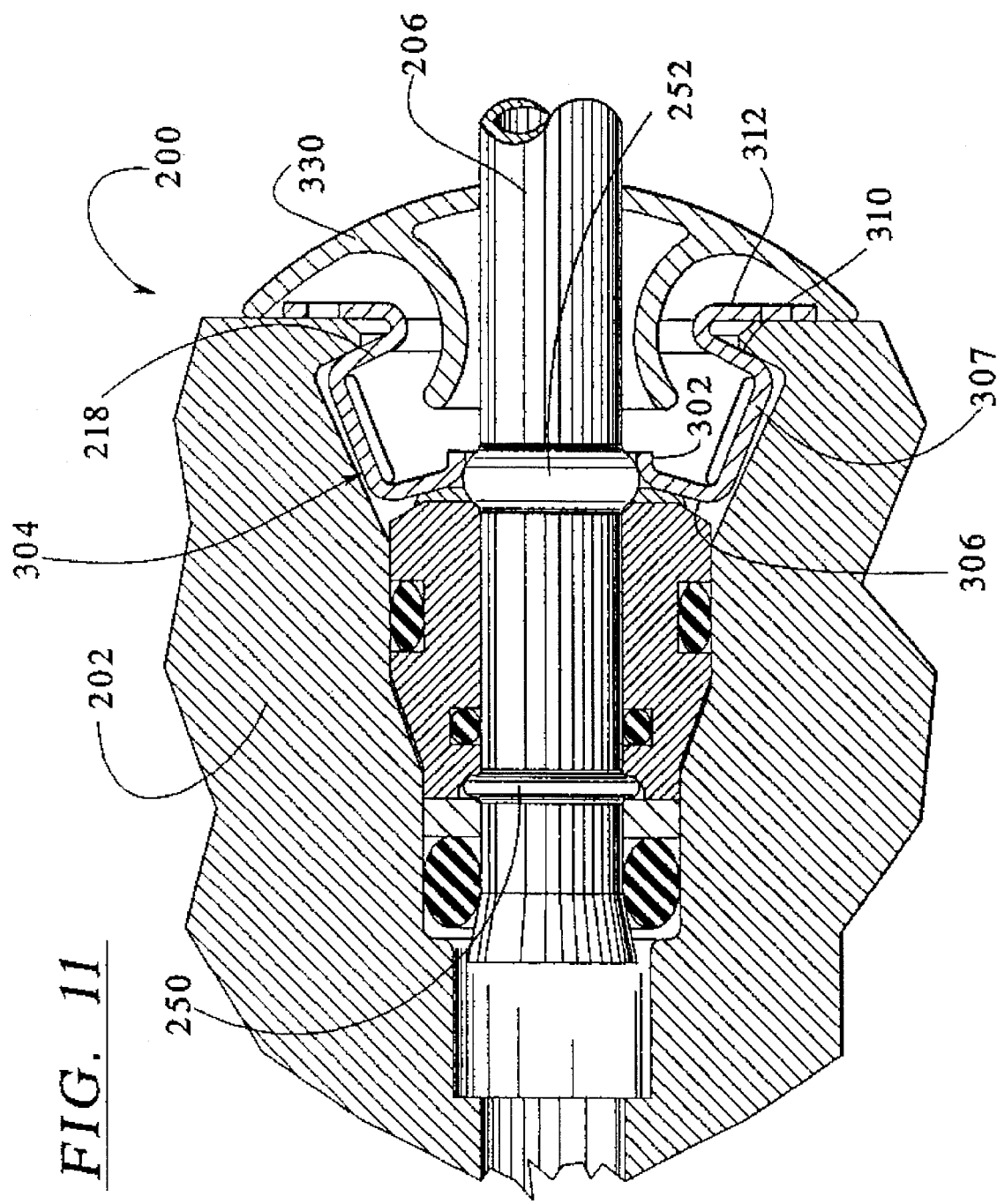
FIG. 11 is a partial sectional view similar to that in FIG. 10, with the addition of a dust boot.

FIG. 10, rotated 90 degrees from FIG. 8, shows secondary retainer 300. Secondary retainer 300, illustrated in greater detail in FIGS. 15–17, includes a central, axial ring 302 which surrounds the crest of second upset 252 of male member 204. A pair of 180 degree displaced arms 304 extend outwardly of ring 302. In their installed condition secondary retainer arms 304 are rotated 90 degrees from primary retainer arms 284, allowing accomodation of both retainers within retainer housing portion 210.

Sections 306 of arms 304 bear against radial ring 282 of primary retainer 280. Sections 308 are substantially parallel to first cylindrical surface 219 of retainer housing portion 210 and extend from sections 306 to arm bends 310. Strengthening braces 309 are formed along the side edges of sections 308. Arm bends 310 have a planar surface of engagement with radial face 218 of retainer housing portion 210, providing secondary or reinforcement retention means for retaining the seal-sleeve-male member assembly within connector body 202. Tangs 312 extend from bends 310 outwardly of connector body 202, providing means for insertion and removal of secondary retainer 300.

Primary retainer 280 is the principal means for retention of male member 204, along with the sleeve and seal assemblies, within connector body 202. Quick connector 200 would remain operational in the absence of secondary retainer 300. However, the provision of a secondary retainer ensures the continued integrity of the connection and seal in the event of a failure or weakening of the primary retainer.

Figure 18:
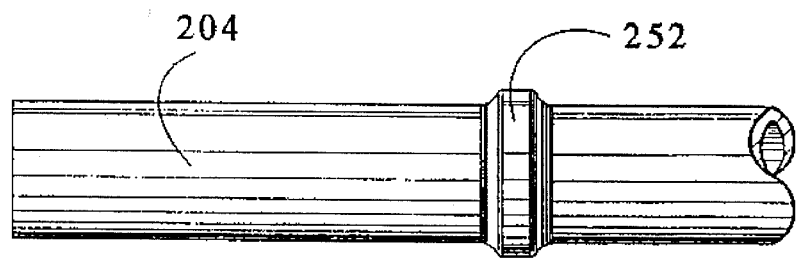
Figure 19:
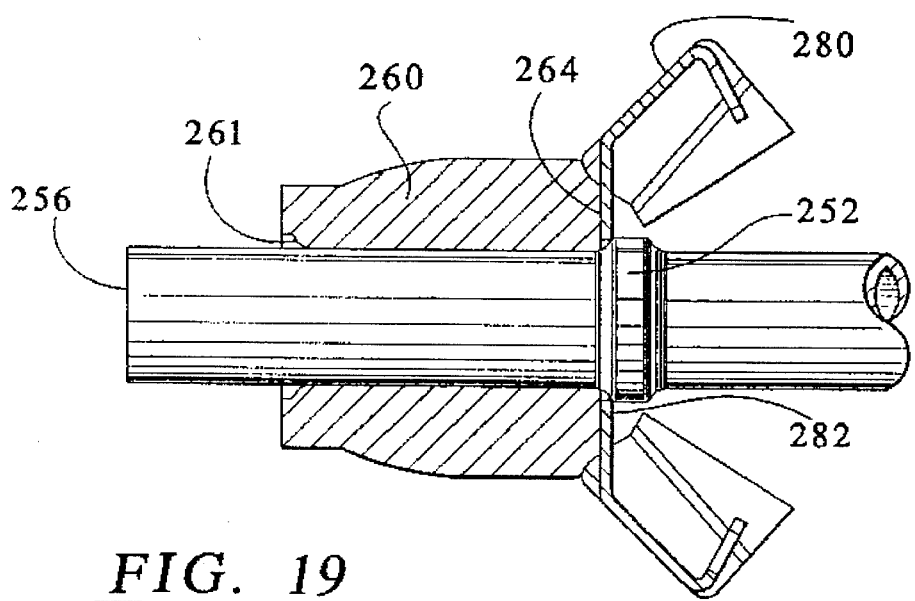
Figure 20:
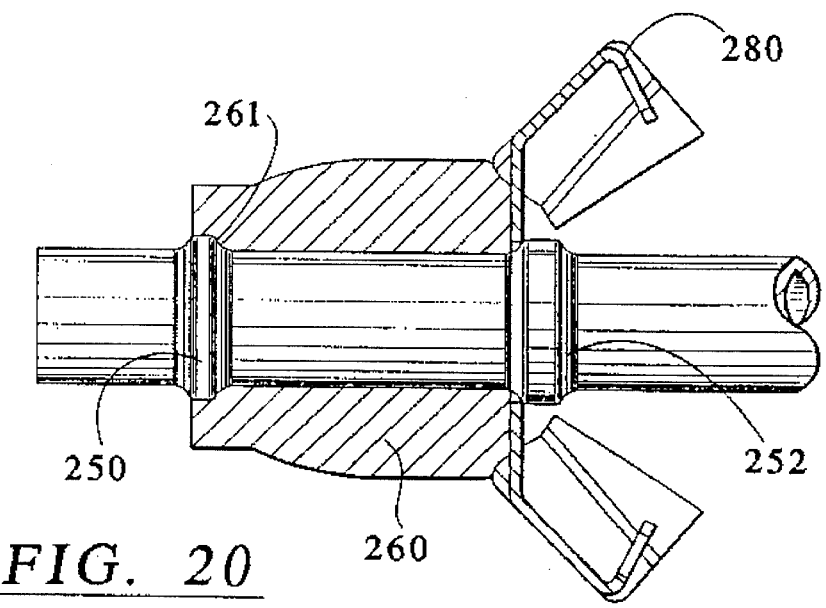

The steps involved in assembling connector 200 are illustrated in detail in FIGS. 18–25. Upset 252 is initially formed on male member 204 (FIG. 18). Next, primary retainer 280 is slipped over end 256 of male member 204 until it abuts upset 252. Sleeve 260 is likewise slipped onto member 204 until its forward face 264 engages retainer ring 282 (FIG. 19). Upset 250 is then formed on male member 204, such that it engages sleeve shoulder 261 and firmly locks sleeve 260 and primary retainer 280 onto member 204 (FIG. 20).

After upset 250 is formed, spacer 236 is loaded on to member 204 to engage rearward face 266 of sleeve 260. End 256 is flared outwardly to retain spacer 236 on member 204 (FIG. 21). Finally, "O" ring 238 is expanded and slipped over flared end 256 (FIG. 22). The assembled seal-sleeve-retainer-male member unit is ready for insertion into female connector body 202. If the assembled unit is to be shipped elsewhere before installation, a shipping cap 320 may be slipped over the unit.

Figure 23:
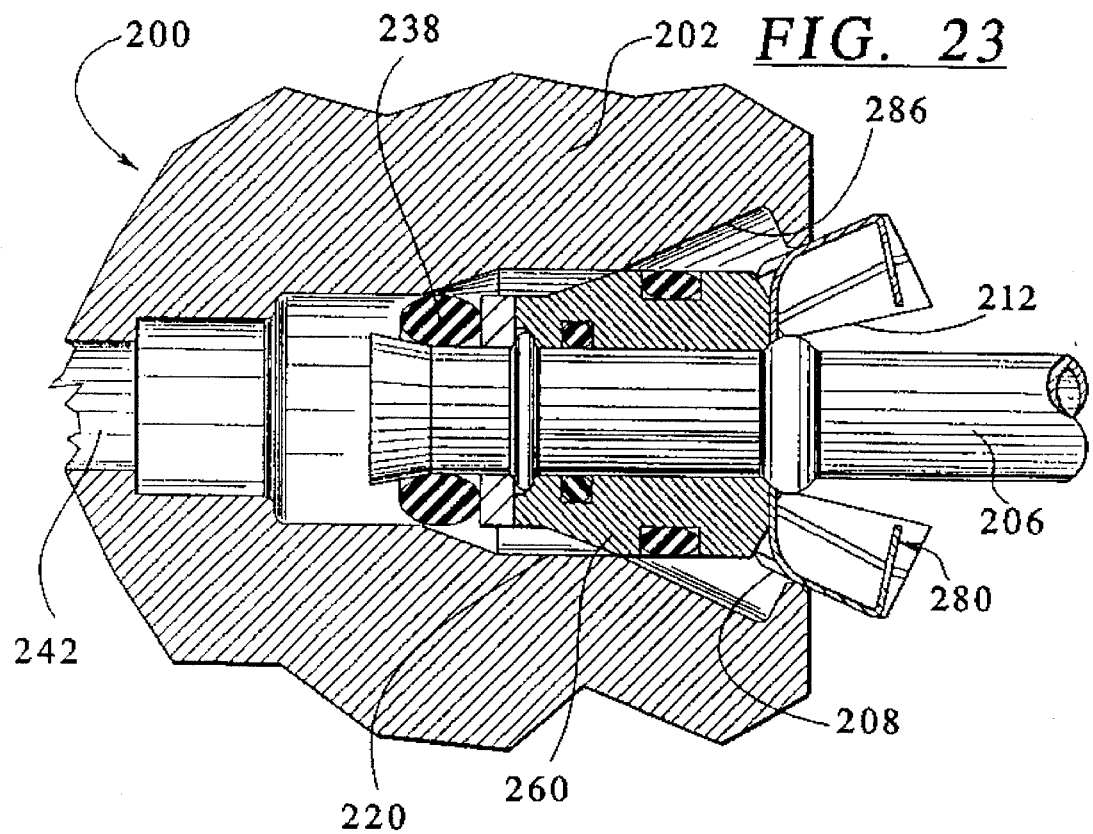

A seal-sleeve-retainer-male member unit assembled as shown in FIGS. 18–22 (with shipping cap 320 omitted) may be directly inserted into female connector body 202. As FIG. 23 illustrates, all parts of the preassembled unit pass easily through entrance 212 into bore 208 with the exception of retainer 280. The close fit of sleeve 260 within sleeve housing portion 220 aids in guiding the assembly through bore 208.

Figure 24:
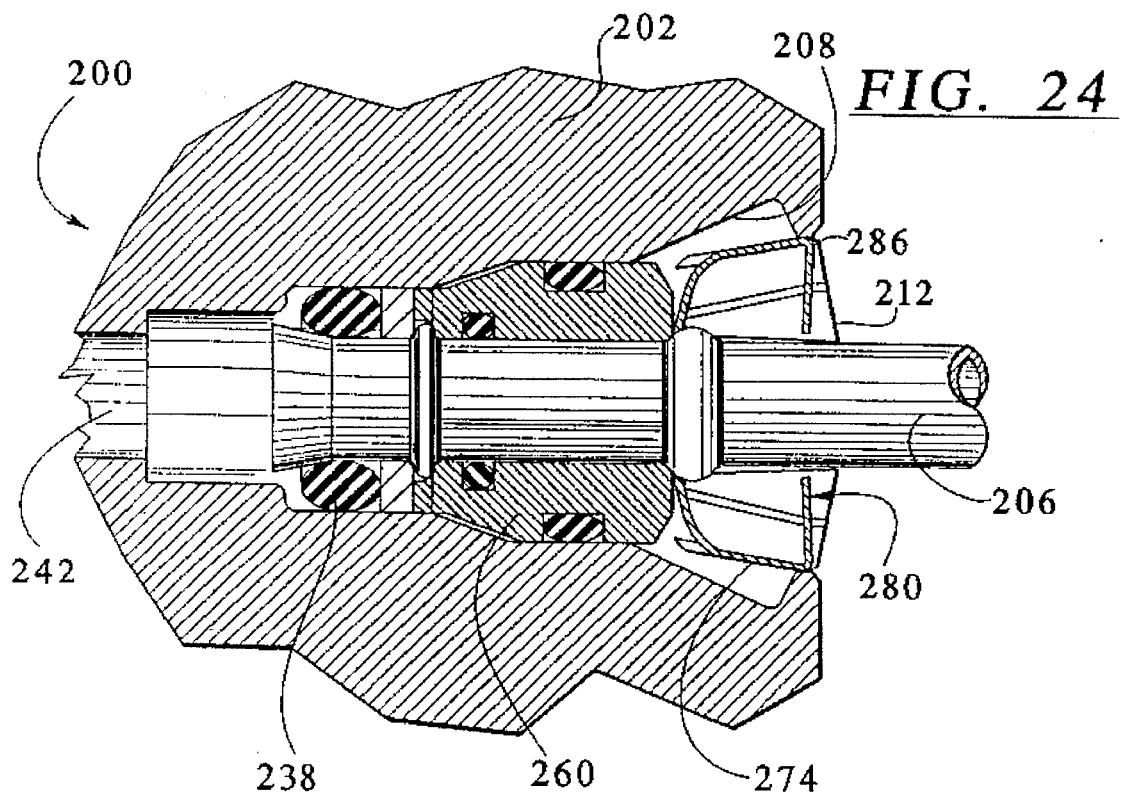
Figure 25:
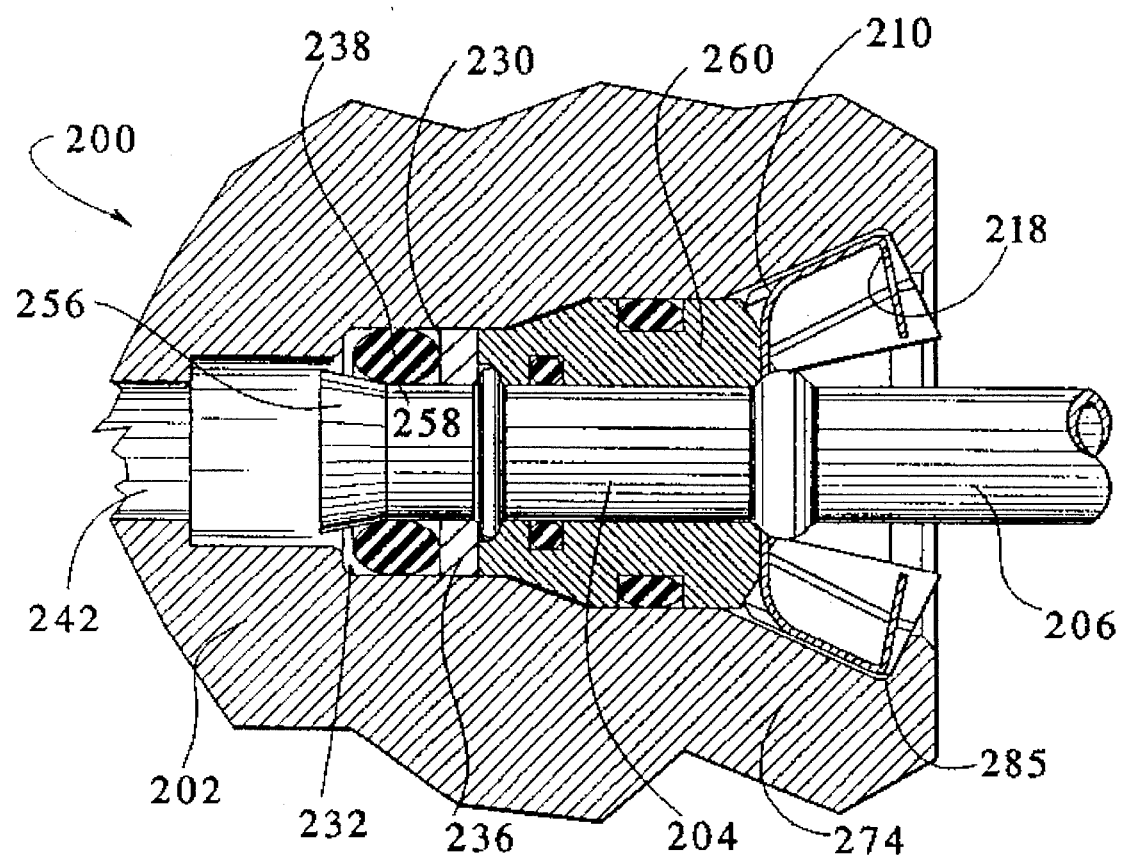

To move retainer 280 through entrance 212, tangs 286 are engaged by an insertion tool (not shown). Arms 284 are flexed inwardly, and retainer 280 is pushed through entrance 212. During this operation, "O" ring 238 goes from an expanded condition (FIG. 23) to a compressed condition (FIG. 24). When retainer 280 is fully inserted, the insertion tool is withdrawn, allowing arms 284 to expand outwardly to seat against the inner peripheral surfaces of retainer housing portion 210. Arm bends 285 abut radial face 218, securing "O" ring 238, spacer 236, sleeve 260 and male member 204 within female connector body 202 (FIG. 25).

When connected in this manner, quick connector 200 provides a closed fluid communication between one component, represented by conduit 242, and another component, represented by tube 206. The connection is securely sealed, with "O" ring 238 being compressed in four directions: vertically between sealing surface 232 of seal housing portion 230 and surface 258 of male member 204; and horizontally between spacer 236 and flared tube end 256. "O" rings 274 and 278 ensure a fluid-tight connection.

Secondary retainer 300 may be installed to provide reinforcement retention means. Retainer 300 is oriented with its arms 304 in 90 degree spaced relation relative to arms 284 of primary retainer 300. Retainer ring 302 is slipped over an end of tube 206 remote from male member 204. An insertion tool is used to engage tangs 312 and to flex arms 304 inwardly. In a fully inserted position (FIG. 10), arm bends 310 contact radial face 218 and arm sections 306 abut radial ring 282 of primary retainer 280. A dust boot 330 (FIG. 11) may be applied after assembly is complete to keep dust, system fluids and other unwanted elements out of bore 208 of connector body 202.

If a secondary retainer is not installed, a protective plug 340 (FIGS. 26–28) may be utilized to prevent introduction of corrosives or other unwanted elements into bore 208. Plug 340 includes a ring 342 with a central opening 344 of substantially the same diameter as male member 204. A pair of 180 degree spaced prongs 346 are attached to one surface 347 of ring 342. Prongs 346 define sloped surfaces 354. Gaps 348 are formed between prongs 346 and ring surface 347. Gaps 348 are of sufficient width to accomodate the combined widths of retainer tangs 286 and annular rim 214. A pair of 180 degree spaced grips 350 are formed on an opposing surface 352 of ring 342.

To install plug 340, it is oriented so that prongs 346 are in 90 degree spaced relation relative to retainer arms 284. Ring 342 is slipped over an end of tube 206 remote from male member 204 and plug 340 is moved across tube 206 until prongs 346 extend into retainer housing portion 210 of connector body 202 and ring surface 347 abuts an outer, vertical surface of body 202. Using grips 350, plug 340 is twisted until prongs 346 are aligned underneath retainer arms 284. Sloped surfaces 354 of prongs 346 facilitate passage of the prongs underneath retainer wings 290. In this position (FIG. 28), retainer tangs 286 and radial rim 214 of connector body 202 are disposed in gaps 348. The abutment of ring surface 347 against the outer periphery of connector body 202 seals bore 208 against the ambient atmosphere.

A second plug embodiment is illustrated in FIGS. 29–31 at 360. Plug 360 includes an outer cover portion 362 and a cylindrical portion 364 of relatively smaller diameter extending axially therefrom. The outer diameter of cover portion 362 exceeds the diameter of entrance 212 to connector body 202. Cover portion 362 and cylindrical portion 364 are hollow, defining a central bore 366 with a diameter approximating the outer diameter of tube 206. Bore 366 is chamfered at the end 372 of cylindrical portion 364 remote from cover portion 362, defining a slightly larger diameter portion.

A planar, annular abutment surface 368 is defined on the side of cover portion 362 adjacent cylindrical portion 364. When plug 360 is installed, abutment surface 368 abuts rim 214 of connector body 202 to prevent introduction of external contaminants into connector body bore 208. Helical threads 370 are formed in the outer periphery of cylindrical portion 364. Threads 370 have an outer radial dimension greater than the inner radial dimension of tangs 286 of retainer 280.

Plug 360 is illustrated in an installed position in FIG. 31. Cylindrical portion 364 is slipped over an end of tube 206 external to connector body 202. Plug 360 is then moved axially over tube 206 until abutment surface 368 of cover portion 362 contacts rim 214 of connector body 202. The flexible nature of retainer 280 permits passage of the threaded portion of plug 360 into bore 208, with retainer arms 284 alternately expanding and relaxing as the radially greater portions of threads 370 pass through tangs 286. Plug 360 "snaps" into place, and is retained on tube 206, as cover portion 362 abuts rim 214 and tangs 286 come to rest between greater radial portions of threads 370. The chamfered portion 372 of bore 366 permits plug 360 to extend partially over tube upset portion 252. The close fit of plug 360 around tube 206 and the abutment of cover portion 362 against rim 214 combine to prevent introduction of external contaminants into connector body bore 208.

The slope of threads 370 prevents removal of plug 360 utilizing axial force alone. To remove plug 360, it must be rotated in a direction such that tangs 286 follow the conical path of the smaller radial portion of threads 370. Sufficient rotation of plug 360 eventually disengages retainer tangs 286 from threads 370. Thus, plug 360 is easily snapped into place, but must be removed utilizing rotational movement, i.e, it must be unscrewed. In this manner, the chances of accidental removal of plug 360 are decreased.

Various features of the present invention have been explained with reference to the embodiments shown and described. It must be understood, however, that modification may be made without departing from the spirit and scope of the invention.

We claim:

1. A quick connector for forming a joint in a fluid line system comprising:

a female connector body defining a bore, said bore extending axially inwardly into said connector body from an entrance, a radial face being defined by said bore axially inwardly of said entrance;

a male member formed at an end of a tube, said male member being received within said bore and having a first enlarged upset formed thereon;

a sleeve surrounding said male member axially outwardly of said first upset, an axially inner end of said sleeve contacting said upset to retain said tube in said bore;

a primary retainer surrounding said male member axially outwardly of said sleeve, said primary retainer including a radially extending ring contacting an axially outer end of said sleeve to retain said sleeve in said bore and arms extending away from said radially extending ring and contacting said radial face of said connector body to retain said retainer in said bore; and a secondary retainer surrounding said male member axially outwardly of said primary retainer, said secondary retainer including an axially extending ring surrounding said male member and arms extending from said ring and contacting said radial face of said connector body to retain said secondary retainer in said bore.

2. A quick connector as claimed in claim 1 wherein said primary retainer arms are rotated ninety degrees from said secondary retainer arms.

3. A quick connector as claimed in claim 2 wherein said secondary retainer arms contact said radially extending ring of said primary retainer.

4. A quick connector as claimed in claim 3 wherein said secondary retainer arms have a planar surface of engagement with said radial face of said connector body.

5. A quick connector as claimed in claim 4 wherein said secondary retainer arms each include a tang extending outwardly of said connector body.

6. A quick connector as claimed in claim 1 wherein a second enlarged upset is formed on said male member axially outwardly of said radially extending ring of said primary retainer, said second upset contacting said radially extending ring to secure said sleeve and said primary retainer on said male member.

7. A quick connector as claimed in claim 6 wherein said axially extending ring of said secondary retainer surrounds said second upset formed on said male member.

8. A quick connector coupling comprising:

a hollow connector body defining an interior radial face;

a male member received in said connector body, said male member having a radially enlarged portion;

a first retainer disposed in said connector body, said first retainer including at least one retention element contacting said radially enlarged portion of said male member and extending from said radially enlarged portion to contact said radial face defined in said connector body to secure said male member in said connector body; and a second retainer disposed in said connector body, said second retainer including at least one retention element contacting said radially enlarged portion of said male member and extending from said radially enlarged portion to contact said interior radial face defined in said connector body to further secure said male member in said connector body.

9. A quick connector coupling as claimed in claim 8 wherein said radially enlarged portion of said male member comprises a sleeve surrounding and retained on said male member between first and second upsets.

10. A quick connector coupling as claimed in claim 9 wherein said first retainer further comprises a first ring surrounding said male member and contacting said sleeve, and said at least one retention element of said first retainer comprises first arms extending away from said first ring to said interior bearing surface.

11. A quick connector coupling as claimed in claim 10 wherein said first ring extends in a radial direction and is secured on said male member between said sleeve and said second upset.

12. A quick connector coupling as claimed in claim 10 wherein said second retainer further comprises a second ring surrounding said male member, and said at least one retention element of said second retainer comprises second arms extending away from said second ring to contact said interior bearing surface.

13. A quick connector coupling as claimed in claim 12 wherein said second ring is positioned between said first ring and said radial face.

14. A quick connector coupling as claimed in claim 13 wherein said first ring extends in a radial direction and said second ring extends in an axial direction, said first ring being secured on said male member between said sleeve and said second upset, and said second ring surrounding said second upset and contacting said first ring.

15. A quick connector coupling as claimed in claim 9 wherein said sleeve defines inner and outer cylindrical surfaces and annular grooves are formed in said inner and outer cylindrical surfaces, and "O" ring seals are disposed in said grooves to provide a fluid seal between said sleeve and said connector body, and between said sleeve and said male member.

* * * * *